United States Patent [19]

Stegelman

[11] 4,285,805
[45] Aug. 25, 1981

[54] TIME-DELAY PROCESS AND CONTROL SYSTEM FOR ELECTROSTATIC FILTER

[75] Inventor: Albert F. Stegelman, Borger, Tex.

[73] Assignee: Phillips Petroleum Company, Bartlesville, Okla.

[21] Appl. No.: 132,199

[22] Filed: Mar. 20, 1980

[51] Int. Cl.³ .................... C10G 9/16; C10G 9/32
[52] U.S. Cl. ................... 208/113; 204/188; 204/302; 208/177; 210/243
[58] Field of Search ............... 208/113, 177; 204/188, 204/302, 307–308; 210/243, 793

[56] References Cited
U.S. PATENT DOCUMENTS

| | | | |
|---|---|---|---|
| 3,190,828 | 6/1965 | Daniel et al. | 208/78 |
| 3,540,026 | 11/1970 | Scott | 340/526 |
| 3,758,400 | 9/1973 | Hampton | 208/72 |
| 3,799,855 | 3/1974 | Franse | 204/188 |
| 3,799,856 | 3/1974 | Franse | 204/188 |
| 3,799,857 | 3/1974 | Franse | 204/188 |
| 3,904,509 | 9/1975 | Anthony | 208/113 |
| 3,928,158 | 12/1975 | Fritsche et al. | 204/188 |
| 4,009,089 | 2/1977 | Crissman et al. | 204/188 |
| 4,059,498 | 11/1977 | Crissman et al. | 204/188 |

Primary Examiner—Delbert E. Gantz
Assistant Examiner—G. E. Schmitkons

[57] ABSTRACT

In an electrostatic filtering process, solids are removed from a solids-containing liquid using an electrostatic filter and the filter is backflushed to remove collected solids, after which power is restored to the filter for a finite time before resumption of the flow of solids-containing liquid through the filter, resulting in a reduction in contamination of the product stream following the backflushing operation. Apparatus is provided to automatically control the electrostatic filtering process. The process and apparatus can be applied in filtering the slurry oil stream in a catalyst cracking operation.

13 Claims, 2 Drawing Figures

TIME-DELAY PROCESS AND CONTROL SYSTEM FOR ELECTROSTATIC FILTER

BACKGROUND OF THE INVENTION

This invention relates to the removal of solid particles from a liquid. In one of its aspects the invention relates to apparatus for controlling the operation of an electrostatic filter. In a further aspect the invention relates to a process for the removal of catalyst particles from a liquid hydrocarbon fraction in a catalytic cracking process.

In the refining of crude oil it is sometimes necessary to remove finely-divided solid particles present in the oil or introduced into a hydrocarbon fraction of the oil during processing. An example of a process in which removal of solid particles from a liquid hydrocarbon is necessary is catalytic cracking, the treatment of petroleum to convert hydrocarbons having a relatively high molecular weight into hydrocarbons of lower boiling range. In this process, the product from the cracking reactor is fractionated to recover light hydrocarbon gasoline and various grades of cycle oil. In the fractionation process, a slurry oil which can be used as a carbon black feedstock is produced. This slurry oil contains catalyst particles which must be removed to provide a suitable carbon black feedstock as well as to prevent waste of the catalyst, which can be returned to the cracking reactor and reused.

The presently preferred method for removing such finely-divided particles from a hydrocarbon fraction is to pass the hydrocarbon through electrostatic filters such as those described in U.S. Pat. No. 4,059,498. In these filters, the suspended solid particles are collected on a bed of glass beads in a high voltage direct current field. After a period of operation, the efficiency of particle removal begins to decline because of the accumulation of solid particles in the filter. The collected particles are removed by taking the filter off stream and backflushing the filter with a liquid. It is often desirable to use the unfiltered feed hydrocarbon as the backflushing medium, as the use of filtered product reduces the overall capacity of the filtering operation. It has been found that resumption of the on-stream operation of the filter following backflushing can be accompanied by contamination of the filtered product stream by solid particles.

It is therefore an object of this invention to provide an improved process and apparatus for operation of an electrostatic filter.

It is a further object of the invention to enable the use of unfiltered fluid as the filter backflush medium without the usual accompanying contamination of the filtered product stream.

SUMMARY OF THE INVENTION

According to the invention, solids are removed from a solids-containing liquid using an electrostatic filter and the filter is backflushed to remove collected solids, after which power is restored to the filter for a finite time before the flow of solids-containing liquid through the filter is resumed. Apparatus is provided which automatically controls the flow of solids-containing liquid and backflush liquid and the delayed resumption of flow following backflushing. In a specific embodiment of the invention, the stream being filtered as a catalyst-contaminated slurry oil from the fractionator of a catalytic cracking process. The operation of an electrostatic filter according to the invention enables the removal of solids from backflush fluid remaining in the filter and reduces contamination of the product stream by those solids.

DETAILED DESCRIPTION OF THE INVENTION

The invention process and apparatus will be described in detail with reference to FIG. 1, which shows a filtering system consisting of three electrostatic filtering units arranged in parallel and a control scheme for automatic operation of the filtering system. The parallel arrangement of the filters makes possible a continuous filtering operation in which a filter or group of filters can be taken off stream, backflushed and returned on stream without interrupting the overall filtering operation. Although three filters are shown for purposes of description, one filter or any number of filters can be operated according to the invention.

Figure 1:
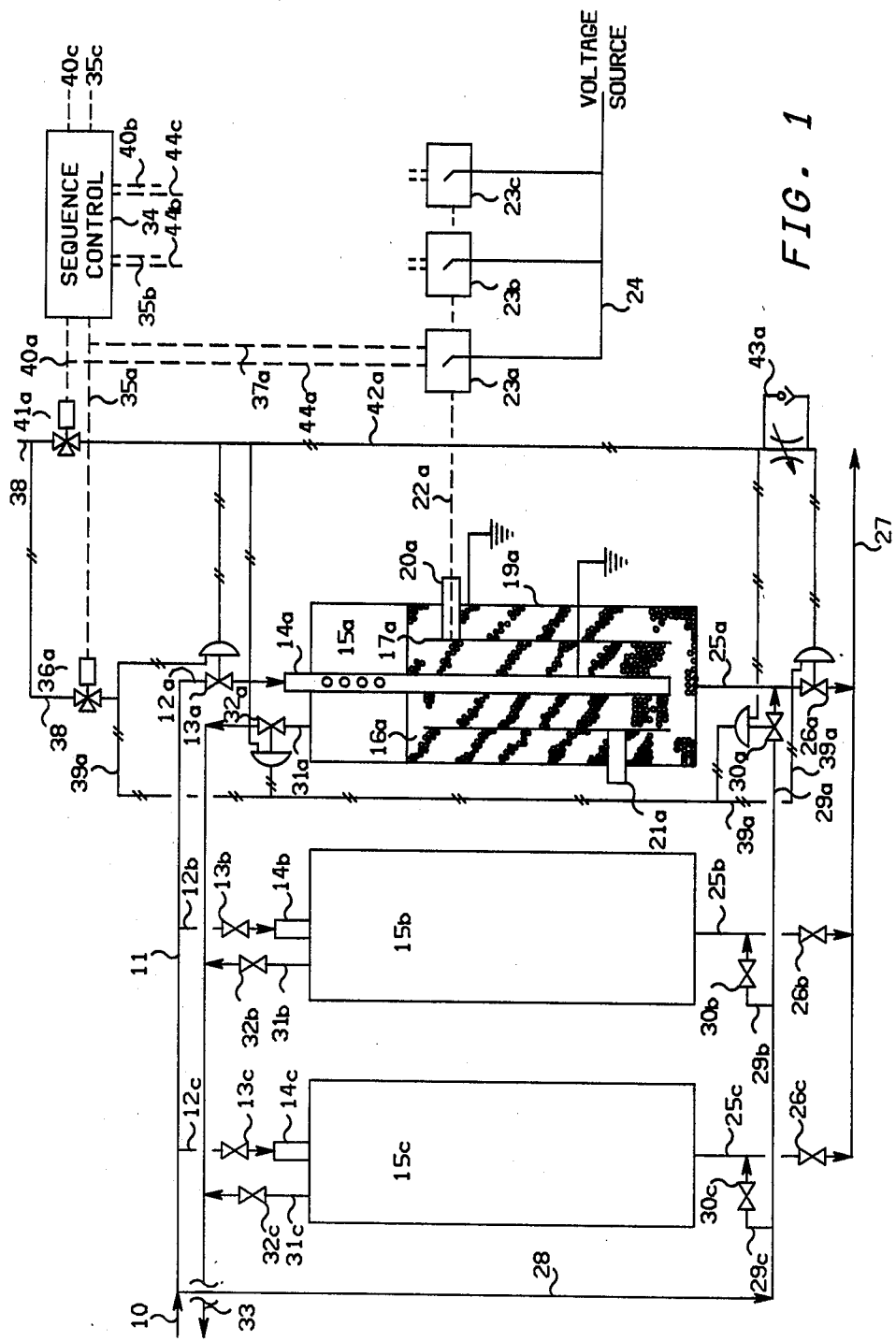
FIG. 1 is a schematic diagram showing a multiple-unit electrostatic filtering system and a control system for operation of the filters according to the invention.

Referring to FIG. 1, a solids-containing liquid is delivered through line 10 to a supply header 11 and into inlet lines 12a, 12b and 12c, which feed into electrostatic filters 15a, 15b and 15c through valves 13a, 13b and 13c, respectively.

As shown in the cross-section of the electrostatic filter 15a, each electrostatic filter 15 contains a filter bed 16 of substantially spherical particles of high electrical resistivity, preferably higher than that of the feed liquid. The spherical particles, or beads, are preferably a ceramic material such as glass and have a smooth surface free of pores or indentations to permit simple removal of collected solids by backflushing. Gridding in the bottom portion of the filter prevents filter bed particles from entering the lower piping. The upper surface of the filter bed 16 is a sufficient distance below the upper end of the filter to permit expansion of the filter bed during backflushing.

Electrostatic filters suitable for the practice of the invention are commercially available and are similar to those described in, for example, U.S. Pat. No. 4,059,498, the disclosure of which is hereby incorporated by reference. Each filter comprises an elongated cylindrical metal casing 19 typically about 8 inches in diameter and 5 feet in length. A tubular electrode 14 extends down into the filter and through a major portion of the length of the bed of filter beads. The upper portion of electrode 14 is perforated to allow solids-containing liquid to be introduced through it into filter bed 16 and to flow longitudinally through the filter bed.

Concentric with inner electrode 14 is an outer cylindrical electrode 17 supported by rods 20 and 21 and connected to a source of high voltage through conductor 22, switch 23, and conductor 24. The power source is adapted to apply a voltage gradient, preferably DC, of about 5 to 20 kv per inch between the outer electrode 17 and the grounded inner electrode 14 and casing 19.

In the filtering process, solids-containing liquid is introduced into the electrostatic filter via inlet line 12 and inlet valve 13. The fluid flows down through inner electrode 14 and into filter bed 16. A voltage gradient maintained across the filter bed during the filtering operation causes solids in the fluid to collect on the filter beads. The filtered fluid passes from the filter through product outlet line 25 to product header 27. Valve 26 controls the flow of filtered product out of the filter. It is also possible to use a filter having separate points of backflush entry and product exit, but this will not affect the operation of the filtering system according to the invention. For simplicity, FIG. 1 has been drawn to show separate points of entry for the solids-containing liquid and exit for the backflush fluid. It is also possible to modify the filtering system so that the backflush outlet and solids-containing liquid inlet merge in a single conduit at a point between the respective outlet and inlet valves and the filter unit.

After a period of operation, the filter bed must be cleaned to remove the collected solids, which can cause excessive current to flow through the filter bed and loss of efficiency of the filter. When an increase in the electrical current flowing between the electrodes is detected or after a predetermined filtering time, a backflushing fluid is passed through backflush supply header 28 into backflush inlet lines 29a, 29b and 29c, and then through filter beds 16. Valves 30 control the flow of backflush fluid into the lower end of the filter.

The backflush fluid can be any low-conductivity liquid, preferably a nonconductive hydrocarbon. The filtered product can be returned to the filter as backwash fluid, but this results in recontamination of that portion of the filtered product, which lowers the overall productivity of the filtering operation. For this reason, it is often convenient and efficient to use the unfiltered feed hydrocarbon as the backwash medium, as shown in FIG. 1.

The backwash fluid is forced upwardly through the filter bed at a rate which causes the bed to expand and the particles of the bed to move relative to one another, releasing the collected solids from the bed. The backflush liquid carries the solids up through the filter and out through header 33 via backflush outlet line 31. Backflush outlet valve 32 controls the flow of backflush fluid from the filter.

As discussed above, the preferred backflush medium is frequently the unfiltered feed fluid. It has been found that the use of this unfiltered fluid or any fluid which contains particulate matter, or even a pure liquid if sufficiently long backwash times are not employed to remove all particles from the filter bed, can result in the contamination of the product with solids upon resumption of the filtering operation after backflushing. This problem can be avoided, however, if the following backflush method is used.

Automatic sequence control means 34 contains timing elements set to begin the backflush operation for a given filter after a predetermined filtering time, which will depend upon the feed being filtered and other process variables. A timing element in the sequence controller activates a relay device, which causes a signal 35a and 37a from the sequence controller to energize and thus open valve 36a, shown as a three-way solenoid valve in FIG. 1, in air line 38 and to actuate switch 23a, which moves to the off position and terminates the high voltage power to the filter to be backflushed, here filter 15a. The filtering operation continues in filters 15b and 15c while 15a is off line for backflushing. A suitable sequence control device is a Gulftronic Separator sequence controller supplied by Gulf Research & Development Company.

Air from line 38 flows through open air line valve 36a, and air pressure created in air line 39a closes valves 13a and 26a and opens backflush inlet valve 30a and backflush outlet valve 32a. Illustrated in FIG. 1 is an electrostatic filtering system using two-way pneumatic valves as liquid inlets and outlets. Valves 30 and 32 are adjusted so as to open in response to an increase in air pressure in line 39, while valves 13 and 26 are set to close with air pressure in line 39.

Backflush fluid is passed through the filter for a time which will depend upon the size and quantity of the particles being removed, the velocity of the backflush fluid and the other process variables. A timing element in sequence controller 34 triggers a relay device at the end of a preset backflushing time, terminating signals 35a and 37a and activating signal 40a, energizing three-way solenoid valve 41a and actuating switch 23a, thereby resuming current to electrode 17a. Solenoid valve 41a opens and pneumatic pressure closes valves 30a and 32a and opens valve 13a. Sequence controller 34 is operatively associated with product outlet valve 26 through delay means 43, which operates to delay the opening of the product outlet valve after the restoration of the voltage gradient across the filter bed. In the system shown in FIG. 1, delay means 43a is a unidirectional flow restrictor in air line 42a which regulates the air flow to valve 26a, delaying the opening of the product outlet valve for a time after pneumatic pressure is applied to line 42a. The flow restrictor can be adjusted to vary the time delay for the opening of valve 26a to insure removal of solids in residual backflush fluid in the filter. In a typical filtering operation as shown, the time delay between the application of voltage to the filter and the opening of the product outlet valve will generally be in the range of about 3 to 10 seconds, preferably about 4 to 8 seconds, although the time can vary outside this range depending upon the nature of the particular process. A suitable unidirectional flow restrictor is manufactured by Crouzet and is available from Miller Fluid Power Company, Bensenville, Illinois.

The opening of the product outlet valve after the time delay permits filtered product to flow out of the filter and marks the resumption of the filtering operation for this filter.

Although the control system has been described in detail with specific reference to double-acting pneumatic valves, an air-restricting delay mechanism, and a sequencer employing a set of automatic timed relay mechanisms to control the actuation and timing of the filtration-backflush cycles, other types of valve means and delay mechanisms are within the scope of the invention, as are other means to actuate the opening and closing of the valves in accordance with the invention.

Figure 2:
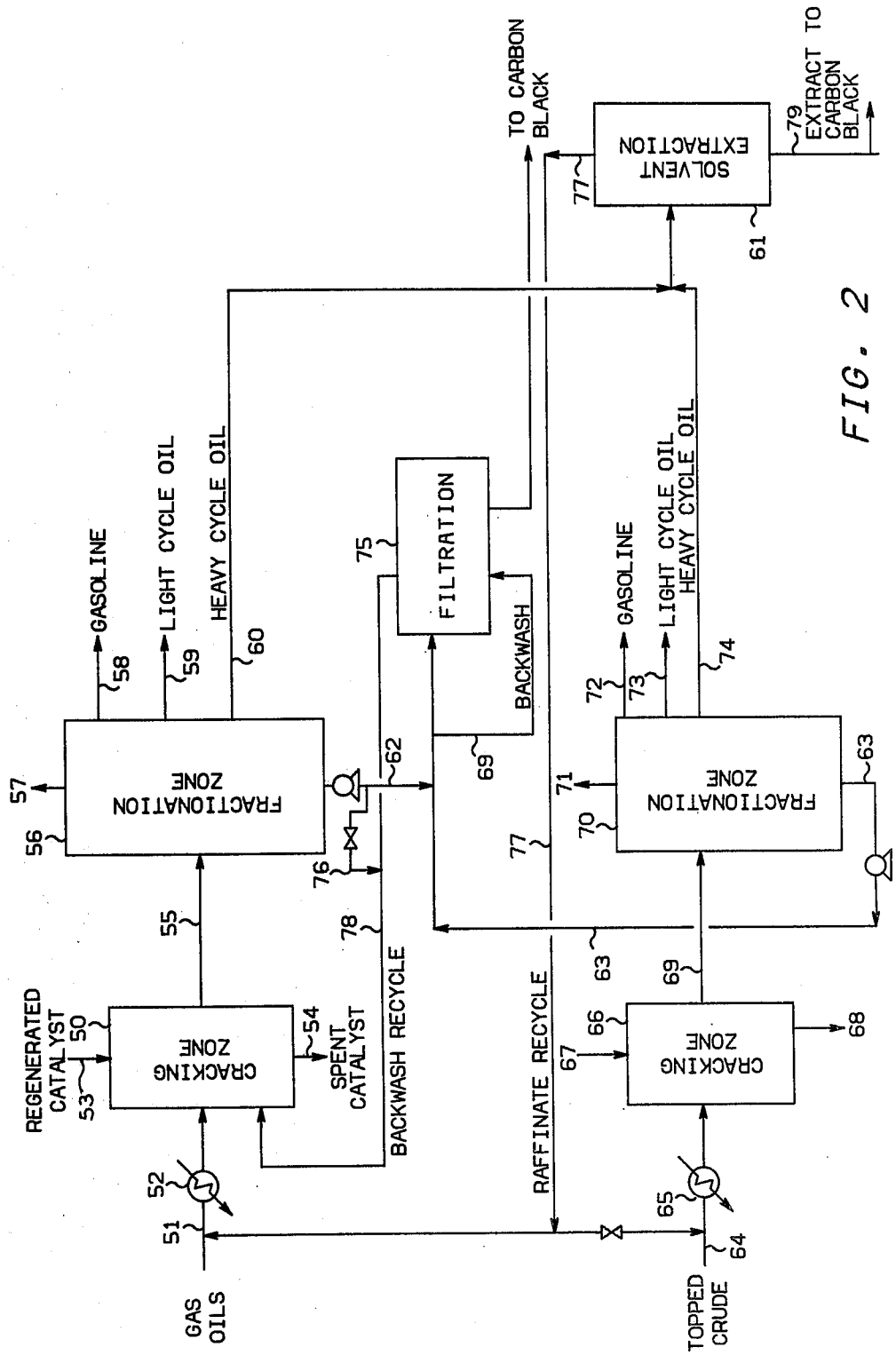
FIG. 2 is a schematic flow diagram of a catalytic cracking process employing the electrostatic filter control system of the invention.

FIG. 2 shows a catalytic cracking process employing an electrostatic filtering system to remove catalyst fines coated with carbon, or "ash," from the fractionator slurry oil.

Referring to FIG. 2, a hydrocarbon feedstream is fed to catalytic cracking zone 50 through conduit 51. This feedstream includes gas oil and other distillates as well as recycle streams from the cracking process. A heat exchanger 52 heats the feed to a temperature slightly below that at which thermal cracking occurs before admission to cracking zone 50. Hot regenerated catalyst is added to the cracking zone via conduit 53 and spent catalyst is removed via conduit 54 and passed to a regeneration zone (not shown) and is then returned to the catalytic cracking zone at a temperature higher than the catalytic cracking temperature so that the mixture of heated oil and regenerated catalyst is at the desired cracking temperature in the cracking zone. The catalyst used is generally chosen from a natural or treated clay, one of various composites of silica gel with alumina, magnesia and/or boria, and activated alumina. The presently preferred cracking catalyst is silica-alumina. The cracking reactor is preferably the fluidized flow type using a finely-divided catalyst, but it can be a fixed bed, moving bed or a suspensoid operation.

The hydrocarbon effluent from cracking zone 50 is passed through conduit 55 to product fractionator 56 where the cracking products are separated into fractions of different boiling ranges. $C_4$ and lighter gases are removed via conduit 57; gasoline is removed in conduit 58; and light cycle oil is removed via conduit 59. Heavy cycle oil, removed via conduit 60, is passed to solvent extraction in 61, in which a suitable solvent such as liquid sulfur dioxide is used in the extraction of aromatic compounds from the oil, producing a paraffinic raffinate which can be returned to the catalytic cracking zone. Slurry oil containing catalyst particles is removed from the bottom of the fractionator via conduit 62 and flows into line 63, the feed line for the electrostatic filters. A portion of this slurry oil can also be returned via line 76 to the cracking zone with the backwash recycle.

The catalytic cracking process may involve a second cracking unit which processes a hydrocarbon feedstream 64 containing topped crude, pitch and other hydrocarbon fluids containing relatively large amounts of metal contaminants or coke and gas forming components. This feedstream 64 is heated in heat exchanger 65 to a temperature below the catalytic cracking temperature. Recycle catalyst which is employed as make-up catalyst for catalytic cracker 66 is introduced via conduit 67, and catalyst is removed and passed to a regeneration zone via conduit 68. Hydrocarbon products from the cracking zone are passed via conduit 69 to fractionation zone 70. $C_4$ and lighter hydrocarbons are removed via conduit 71; gasoline is removed in conduit 72; and light cycle oil is removed via conduit 73. Heavy cycle oil removed in 74 is passed to solvent extraction zone 61. The aromatic hydrocarbon extract from extraction zone 61 is recovered via conduit 79 for use as feed to, for example, a carbon black manufacturing plant. Slurry oil bottoms from fractionation zone 70 are passed via conduit 63 to filtration zone 75 for removal of catalyst particles. The raffinate removed from solvent extraction zone 51 can be passed via conduit 77 as feed to cracking zone 50.

Slurry oil fractionator bottoms from fractionator 56 can be combined with slurry oil from fractionator 70 in line 63 and fed into individual electrostatic filters in a filtration zone 75, as shown in greater detail in FIG. 1, to remove the catalyst particles from the slurry. Filtration zone 75 can contain one filter but preferably contains a set of as many as eight or more electrostatic filters. The arrangement of filters and control system can be such that any individual filter or group of filters can be isolated from the process and backflushed periodically while maintaining the filtering operation in the remaining filters.

On-stream time for a filter can vary widely but generally ranges from about 15 to 60 minutes for a hydrocarbon cracking process such as that described. When a filter bed has reached its capacity for collected solids or after a preset filtering time, the backflushing process is begun by closing valves on the process stream into and the product stream out of the filter, e.g., returning to FIG. 1, valves 13 and 26 of the filter or filters to be backflushed. The electric power supplying the voltage gradient across the filter bed is turned off and valves 30 and 32 in the backflush line are opened, causing unfiltered slurry oil from line 10 via line 28 to flow in a reverse direction through the filter bed, dislodging collected solids from the filter bed and carrying them out via backflush outlet line 31 and backflush header 33. The catalyst-heavy backflush fluid can then be recycled via conduit 78 to the cracking zone.

After a period of backflushing which will typically range from 1.5 to 6 minutes for such a catalyst filtering operation, the valves on the backflush lines are closed, power is restored to the filter unit, and the product inlet valve is opened. Sequencer 34 activates a signal to open air line 42, which provides air pressure to open pneumatic inlet valve 13 and product outlet valve 26. A delay device 43 in air line 42 operates to delay the opening of the product outlet valve for a time sufficient to remove any solids from the oil remaining in the filter. The delay time will generally range from about 3 to about 10 seconds after restoration of current to the filter.

Table I shows the reduction of product ash concentration achieved when the opening of the product outlet valve is delayed according to the process of the invention.

TABLE I

| Run No. | Filtered Product B/H | Inlet Ash Conc. Wt. % | Raw Outlet Ash Conc. PPM | Corrected[1] Outlet Ash Conc. PPM | Time Delay, Sec. |
|---|---|---|---|---|---|
| 1 | 65 | 2.130 | 78 | 73 | Normal[2] |
| 2 | 65 | 1.982 | 46 | 46 | 8 |
| 3 | 60 | 1.572 | 36 | 42 | 8 |
| 4 | 68 | 1.204 | 62 | 108 | Normal |
| 5 | 58 | 0.953 | 38 | 71 | 4 |
| 6 | 52 | 0.836 | 28 | 54 | 5 |
| 7 | 52 | 0.836 | 32 | 61 | Normal |
| 8 | 68 | 1.204 | 58 | 101 | Normal |
| 9 | 52 | 0.836 | 42 | 80 | 4 |
| 10 | 52 | 0.836 | 52 | 100 | Normal |

[1] A corrected ash concentration calculation puts the data on the common basis of 2.0 weight percent ash in the feed and 65 B/H flow of product. The equation is:

$$\text{correct ash} = \text{raw data} \times \frac{2.0 \text{ wt. \%}}{\text{ash in feed}} \times \frac{\text{Product B/H}}{65 \text{ B/H}}$$

[2] The normal time required for the valve to open is 2.2 to 2.4 seconds.

The practice of the invention thus results in the reduction of the contamination of the product stream by ash from the backflush fluid. The failure to completely remove particles from the product stream is attributed to the presence of backflush fluid in piping common to both the product and the backwash liquid, as shown for example in conduit 25a in FIG. 1.

I claim:

1. A process for removing solid particles from a liquid which comprises:
   (a) passing the solids-containing liquid through an electrostatic filter having a filter bed of high electrical resistivity while maintaining a voltage gradient across the filter bed;
   (b) stopping the flow of the solids-containing liquid and interrupting the voltage gradient across the filter bed;
   (c) backflushing a liquid through the filter bed at a rate which results in expansion of the filter bed, thereby removing solid particles deposited in the filter bed;

(d) stopping the flow of the backflush liquid through the filter bed;

(e) restoring the voltage gradient across the filter bed; and (f) resuming the flow of the solids-containing liquid through the electrostatic filter at least three seconds after the voltage gradient is restored.

2. A process according to claim 1 in which the solids-containing liquid is used as the backflush liquid.

3. A process according to claim 1 in which the time period between restoring the voltage gradient across the filter bed and resuming the flow of the solids-containing liquid is within the range of 3 to about 10 seconds.

4. A process according to claim 1 in which the solids-containing liquid is a hydrocarbon of low electrical conductivity.

5. A process according to claim 1 in which the hydrocarbon is slurry oil from a catalytic cracking process and the solid particles comprise cracking catalyst.

6. A process according to claim 1 wherein the electrostatic filter has a slurry inlet for flow of the solids-containing liquid into the electrostatic filter, a product outlet for flow of filtered liquid out of the electrostatic filter, a backflush inlet, a backflush outlet, and wherein step (a) comprises opening the slurry inlet and the product outlet, step (b) comprises closing the slurry inlet and the product outlet, step (c) comprises opening the backflush inlet and backflush outlet, step (d) comprises closing the backflush inlet and the backflush outlet, and step (f) comprises opening the slurry inlet and, at least the seconds after restoring the voltage gradient, opening the product outlet.

7. The process of claim 6 in which the solids-containing liquid and the backflush liquid are slurry oil from a catalytic cracking process, the solid particles comprise cracking catalyst, and the time period between restoring the voltage gradient and opening the product outlet is within the range of 3 to about 10 seconds.

8. Apparatus comprising:
an electrostatic filter having a filter bed of high electrical resistivity;
means to apply a voltage gradient across the filter bed;
switch means to control the application of the voltage gradient across the filter bed;
first valve means to control the flow of a solids-containing liquid into the electrostatic filter;
second valve means to control the flow of a filtered product out of the electrostatic filter;
third valve means to control the flow of a backflush liquid into the electrostatic filter;
fourth valve means to control the flow of the backflush liquid out of the electrostatic filter;
first actuation means to close the first and second valve means, to open the third and fourth valve means, and to actuate the switch means to interrupt the voltage applied to the filter bed;
second actuation means to close the third and fourth valve means, to open the first and second valve means, and to actuate the switch to re-establish the voltage gradient, the second activation means including delay means to cause the opening of the second valve means to be delayed a finite time after actuation of the switch.

9. Apparatus for controlling the operation of an electrostatic filter comprising a filter bed of high electrical resistivity, means to apply a voltage gradient across the filter bed; switch means to control the application of the voltage gradient across the filter bed, first valve means to control the flow of the solids-containing liquid into the electrostatic filter, second valve means to control the flow of filtered product out of the electrostatic filter, third valve means to control the flow of a backflush liquid into the electrostatic filter, fourth valve means to control the flow of the backflush liquid out of the electrostatic filter, said means for controlling comprising:
first actuation means to close the first and second valve means and open the third and fourth valve means and to actuate the switch means to interrupt the voltage applied to the filter bed;
second actuation means to close the third and fourth valve means and open the first and second valve means and to actuate the switch to re-establish the voltage gradient; and
delay means to cause the opening of the second valve means to be delayed a finite time after actuation of the switch.

10. Apparatus according to claim 8 or claim 9 wherein the first, second, third and fourth valve means are pneumatic valves and the delay means is a one-way air flow restrictor.

11. A catalytic cracking process comprising;
passing a feed hydrocarbon to a cracking zone wherein it is catalytically converted to hydrocarbons having a lower boiling range than the feed hydrocarbon;
passing a cracking product comprising lower-boiling hydrocarbons and catalyst particles to a fractionation zone and withdrawing a plurality of boiling-range fractions;
withdrawing a slurry oil containing catalyst particles from the lower portion of the fractionation zone;
passing the slurry oil to a filtration zone comprising at least one electrostatic filter having a filter bed of high electrical resistivity, a slurry inlet valve, a product outlet valve, a backflush inlet valve, and a backflush outlet valve; means to apply a voltage gradient across the filter bed and swith means to control the application of the voltage gradient; first actuation means to close the slurry inlet valve and the product outlet valve and open the backflush inlet valve and the backflush outlet valve and to actuate the switch means to interrupt the voltage; second actuation means to close the backflush inlet valve and the backflush outlet valve and open the slurry inlet valve and the product outlet valve and to actuate the switch to reestablish the voltage gradient, the second activation means including delay means to cause the opening of the second valve means to be delayed for a finite time after actuation of the switch;
passing the slurry oil through the electrostatic filter having a voltage gradient applied across the filter bed, thereby removing catalyst particles from the slurry oil;
periodically actuating the first actuation means and passing a backflush fluid through the filter bed with sufficient velocity to remove a substantial portion of the collected catalyst particles;

thereafter actuating the second activation means and resuming the passage of slurry oil through the electrostatic filter; and withdrawing a filtered product stream from the filtration zone.

12. The catalytic cracking process of claim 11 in which the catalyst particles removed from the filter bed are returned to the cracking zone.

13. The catalytic cracking process of claim 12 in which the backwash fluid is catalyst-containing slurry oil from the fractionation zone.

* * * * *